United States Patent
Chakra et al.

(10) Patent No.: US 9,563,879 B2
(45) Date of Patent: Feb. 7, 2017

(54) PROVIDING ACCURATE RECIPIENT LISTS BY CORRELATING TAGGED KEYWORDS TO RECIPIENT LISTS

(75) Inventors: Al Chakra, Apex, NC (US); Gary Denner, Longwood (IE); Itzhack Goldberg, Hadera (IL); Mette F. Hammer, Dublin (IE); George Kyriacou, Dublin (IE); Patrick J. O'Sullivan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1008 days.

(21) Appl. No.: 13/166,961

(22) Filed: Jun. 23, 2011

(65) Prior Publication Data

US 2012/0330951 A1 Dec. 27, 2012

(51) Int. Cl.
    *G06F 17/30* (2006.01)
    *G06Q 10/10* (2012.01)
    *H04L 12/58* (2006.01)
    *H04M 1/725* (2006.01)

(52) U.S. Cl.
    CPC ........ *G06Q 10/107* (2013.01); *G06F 17/30017* (2013.01); *G06F 17/30749* (2013.01); *G06F 17/30772* (2013.01); *G06F 17/30879* (2013.01); *H04L 51/04* (2013.01); *H04L 51/16* (2013.01); *H04M 1/72547* (2013.01)

(58) Field of Classification Search
    CPC .............. G06F 17/30675; G06F 17/30864; G06F 17/30017; G06F 17/30749; G06F 17/30772; G06F 17/30879; G06F 17/30; G06Q 10/10; G06Q 10/107; G06Q 10/109; G06Q 40/00; G06Q 40/123; G06Q 40/12; H01M 1/274583; H01M 1/72547; H04L 51/04

USPC ....... 707/769, 791, 802, 804, 706, 668, 673, 707/E17.014, E17.044, E17.005, E17.032, 707/E17.064, E17.084, 613, 750, 707/999.003; 709/206; 715/234, 739; 726/26, 28, 30

See application file for complete search history.

(56) References Cited

U.S. PATENT DOCUMENTS

| | | | |
|---|---|---|---|
| 5,537,586 A | 7/1996 | Amram et al. | |
| 6,529,942 B1 * | 3/2003 | Gilbert | ............ 709/206 |
| 7,266,546 B2 | 9/2007 | Son | |
| 7,562,287 B1 * | 7/2009 | Goldstein et al. | ............ 715/201 |

(Continued)

OTHER PUBLICATIONS

"Correlation and suggestion of recipient-list based on subject and content keywords" IP.com Prior art Database Technical Disclosure—Apr. 26, 2011 (pp. 1-3).*

(Continued)

*Primary Examiner* — Anh Ly
(74) *Attorney, Agent, or Firm* — Robert A. Voigt, Jr.; Winstead, P.C.

(57) ABSTRACT

A method, system and computer program product for providing accurate recipients lists. Keywords (e.g., processor, monitor) in a document (e.g., electronic mail message) are identified. These keywords are tagged, where tagging refers to an index term assigned to a piece of information, such as these keywords. A list of recipients may be provided to be correlated with these tagged keywords. The list of recipients is associated with these tagged keywords thereby providing a predefined recipient list to be used when a subsequent document with these tagged keywords is identified. Furthermore, the user is provided an option to modify this recipient list when a subsequent document containing the tagged keywords associated with the recipient list is identified thereby ensuring an accurate recipient list is used.

17 Claims, 5 Drawing Sheets

(56) References Cited

U.S. PATENT DOCUMENTS

| | | |
|---|---|---|
| 8,239,460 B2* | 8/2012 | Meek et al. ............... 707/668 |
| 8,473,493 B2* | 6/2013 | Jin et al. ................. 707/736 |
| 2004/0215479 A1 | 10/2004 | Dorsey et al. |
| 2005/0246627 A1* | 11/2005 | Sayed ..................... 715/513 |
| 2006/0005247 A1* | 1/2006 | Zhang et al. .............. 726/26 |
| 2007/0106735 A1* | 5/2007 | Hardy .................... 709/206 |
| 2007/0106736 A1* | 5/2007 | Shepherd ................ 709/206 |
| 2008/0059419 A1* | 3/2008 | Auerbach et al. .......... 707/3 |
| 2008/0250114 A1* | 10/2008 | Dubovsky et al. ......... 709/206 |
| 2009/0006285 A1* | 1/2009 | Meek et al. .............. 707/100 |
| 2009/0012940 A1* | 1/2009 | Ives et al. ................. 707/3 |
| 2009/0024648 A1* | 1/2009 | Heix et al. ............... 707/102 |
| 2009/0222738 A1* | 9/2009 | Drieschner .............. 715/739 |
| 2009/0241016 A1* | 9/2009 | Kihara et al. ............ 715/205 |
| 2009/0254529 A1* | 10/2009 | Goldentouch ............... 707/3 |
| 2009/0313706 A1* | 12/2009 | Zhang et al. ............. 726/30 |
| 2010/0129065 A1* | 5/2010 | Porter et al. ............. 707/769 |
| 2010/0131604 A1* | 5/2010 | Portilla .................. 709/206 |
| 2011/0131207 A1* | 6/2011 | Jonsson .................. 707/730 |
| 2011/0184937 A1* | 7/2011 | Jin et al. ................. 707/722 |
| 2011/0246482 A1* | 10/2011 | Badenes et al. .......... 707/748 |
| 2011/0307496 A1* | 12/2011 | Jones et al. ............. 707/748 |
| 2011/0320478 A1* | 12/2011 | Carlson et al. ........... 707/769 |
| 2012/0330951 A1* | 12/2012 | Chakra et al. ............ 707/736 |
| 2013/0046785 A1* | 2/2013 | Assadollahi ............. 707/776 |

OTHER PUBLICATIONS

"DNN Email Services & Management Modules," http:www.dotnetnukeemail.com, 2011.

* cited by examiner

PROVIDING ACCURATE RECIPIENT LISTS BY CORRELATING TAGGED KEYWORDS TO RECIPIENT LISTS

TECHNICAL FIELD

The present invention relates to contact management, and more particularly to providing accurate recipient lists by correlating tagged keywords to the recipient lists.

BACKGROUND

Documents, such as a word processing document or an electronic mail message, may be sent to a group of individuals through a recipient list, which contains a list of designated individuals to receive a particular document.

However, documents often contain information that is updated. Once such information is updated, the recipient list may be outdated. That is, the list of designated individuals to receive the revised content may be outdated. As a result, the recipient list may need to be modified, such as by adding individuals to the recipient list or deleting individuals from the recipient list.

Currently though such a recipient list is manually maintained. As a result, a user has to keep track of changes to the content of these documents as well as manually modify the associated recipient list based on these content changes. Such a process is inefficient resulting in potential inaccuracies in the recipient list.

BRIEF SUMMARY

In one embodiment of the present invention, a method for providing accurate recipient lists comprises identifying keywords in a document. The method further comprises tagging the identified keywords in the document. Additionally, the method comprises receiving a list of recipients to be correlated with the tagged keywords. In addition, the method comprises associating, by a processor, the received list of recipients with the tagged keywords.

Other forms of the embodiment of the method described above are in a system and in a computer program product.

In another embodiment of the present invention, a method for providing accurate recipient lists comprises identifying a set of recipients that received a notice of content changes to a document. The method further comprises identifying keywords in the document. In addition, the method comprises creating, by a processor, a tag of the identified keywords to be associated with the set of recipients.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for providing accurate recipients lists. In one embodiment of the present invention, keywords (e.g., processor, monitor) in a document (e.g., electronic mail message) are identified. These keywords are tagged, where tagging refers to an index term assigned to a piece of information, such as these keywords. A list of recipients may be provided to be correlated with these tagged keywords. The list of recipients is associated with these tagged keywords thereby providing a predefined recipient list to be used when a subsequent document with these tagged keywords is identified. Furthermore, the user is provided an option to modify this recipient list when a subsequent document containing the tagged keywords associated with the recipient list is identified thereby ensuring an accurate recipient list is used.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
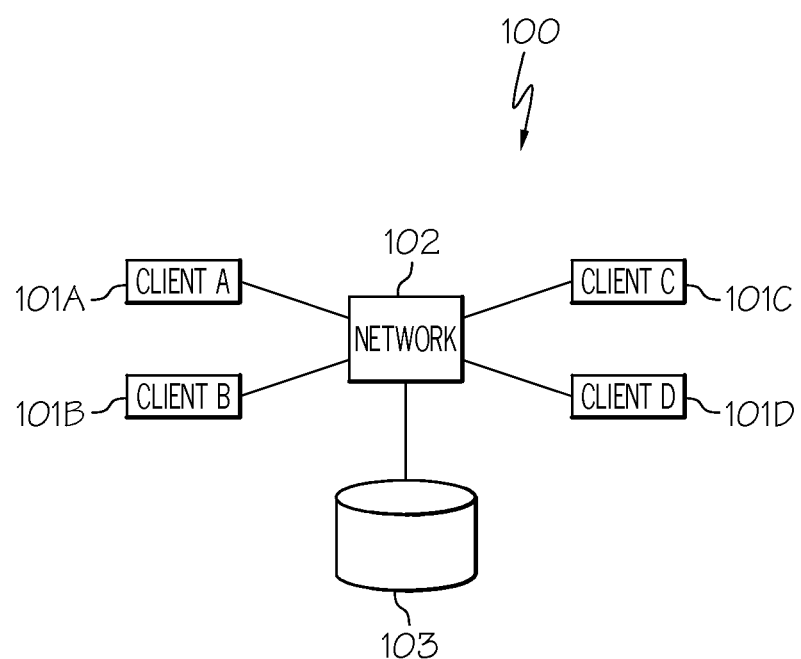
FIG. 1 illustrates a network system configured in accordance with an embodiment of the present invention.

Referring now to the Figures in detail, FIG. 1 illustrates a network system 100 configured in accordance with an embodiment of the present invention. Referring to FIG. 1, network system 100 includes clients 101A-101D in communication with one another via a network 102 (e.g., local area network, wide area network). Clients 101A-101D may collectively or individually be referred to as clients 101 or client 101, respectively. Client 101 is interconnected with network 102 via any medium type (e.g., wireless, wired). Furthermore, client 101 may be any type of device (e.g., portable computing unit, personal digital assistant (PDA), smartphone, desktop computer system, workstation, Internet appliance and the like) configured with the capability of connecting to network 102 and consequently communicating with other clients 101. Such communication includes, but not limited to, sending electronic mail messages, via a mail server (not shown) or a mail transfer agent (not shown) in client 101, that allows the transfer of electronic mail messages from one client 101 to another client 101. Other communication includes sending documents, such as word processing documents, stored in a database 103 connected to network 102.

In one embodiment, client 101 is configured to provide accurate recipient lists for a user of client 101 by correlating tagged keywords with recipient lists as discussed further below. Furthermore, client 101 is configured to identify changes to the contents of documents stored in database 103 as discussed further below. A description of one embodiment of a hardware configuration of client 101 is provided below in connection with FIG. 2.

FIG. 1 may include any number of clients 101 interconnected amongst each other via network 102. FIG. 1 is not to be limited in scope to any one particular embodiment.

Figure 2:
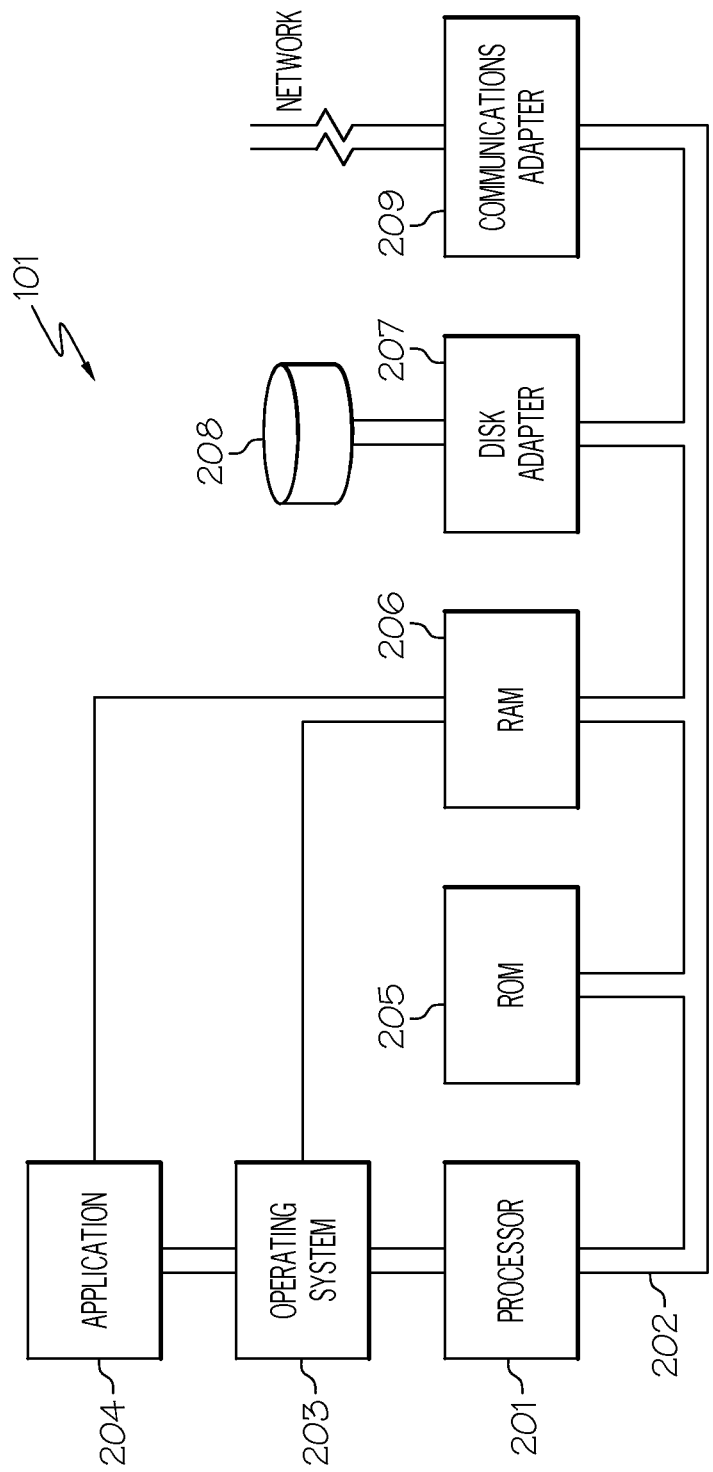
FIG. 2 illustrates a hardware configuration of a client configured in accordance with an embodiment of the present invention.

Referring now to FIG. 2, FIG. 2 illustrates a hardware configuration of client 101 which is representative of a hardware environment for practicing the present invention. Referring to FIG. 2, client 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for providing accurate recipient lists by correlating tagged keywords to the recipient lists, as discussed further below in association with FIGS. 3-5.

Referring again to FIG. 2, read-only memory ("ROM") 205 is coupled to system bus 202 and includes a basic input/output system ("BIOS") that controls certain basic functions of client 101. Random access memory ("RAM") 206 and disk adapter 207 are also coupled to system bus 202. It should be noted that software components including operating system 203 and application 204 may be loaded into RAM 206, which may be client's 101 main memory for execution. Disk adapter 207 may be an integrated drive electronics ("IDE") adapter that communicates with a disk unit 208, e.g., disk drive. It is noted that the program for providing accurate recipient lists by correlating tagged keywords to the recipient lists, as discussed further below in association with FIGS. 3-5, may reside in disk unit 208 or in application 204.

Client 101 may further include a communications adapter 209 coupled to bus 202. Communications adapter 209 interconnects bus 202 with an outside network (network 102) thereby enabling client 101 to communicate with other clients 101.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, documents often contain information that is updated. Once such information is updated, the recipient list may be outdated. That is, the list of designated individuals to receive the revised content may be outdated. As a result, the recipient list may need to be modified, such as by adding individuals to the recipient list or deleting individuals from the recipient list. Currently though such a recipient list is manually maintained. As a result, a user has to keep track of changes to the content of these documents as well as manually modify the associated recipient list based on these content changes. Such a process is inefficient resulting in potential inaccuracies in the recipient list.

Figure 3:
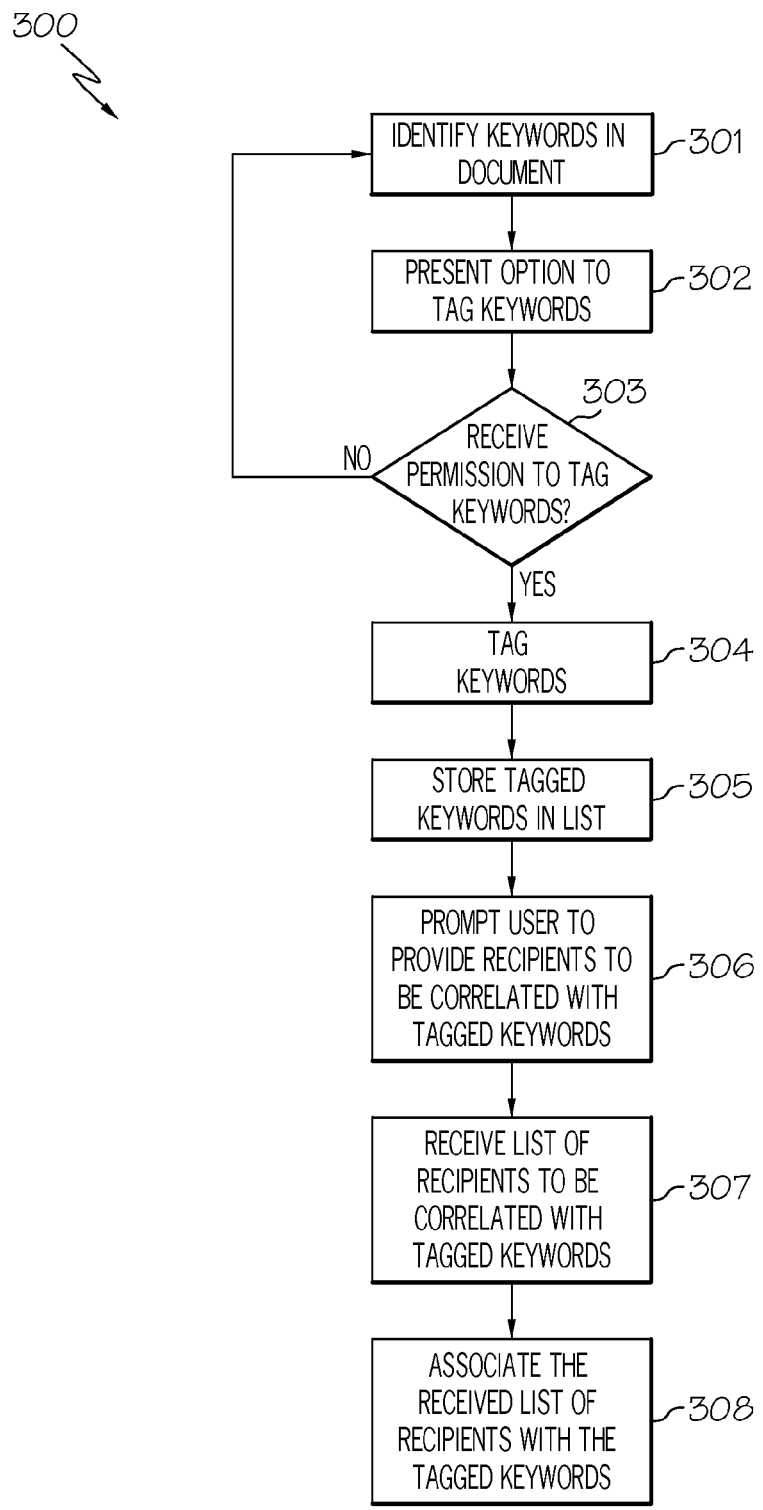
FIG. 3 is a flowchart of a method for correlating a recipient list with tagged keywords in accordance with an embodiment of the present invention.
Figure 4:
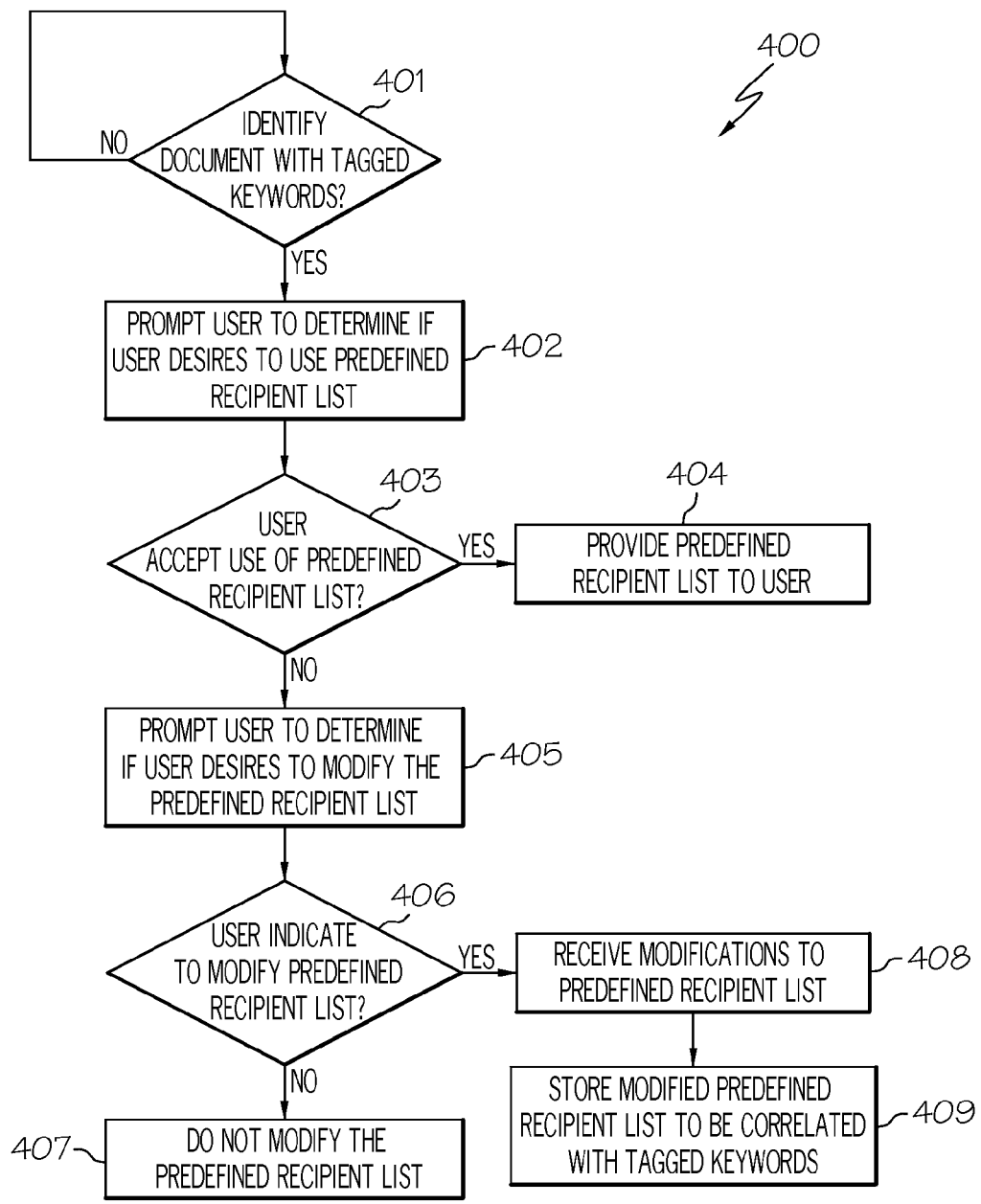
FIG. 4 is a flowchart of a method for using a recipient list after the recipient list has been initially correlated with tagged keywords in accordance with an embodiment of the present invention.
Figure 5:
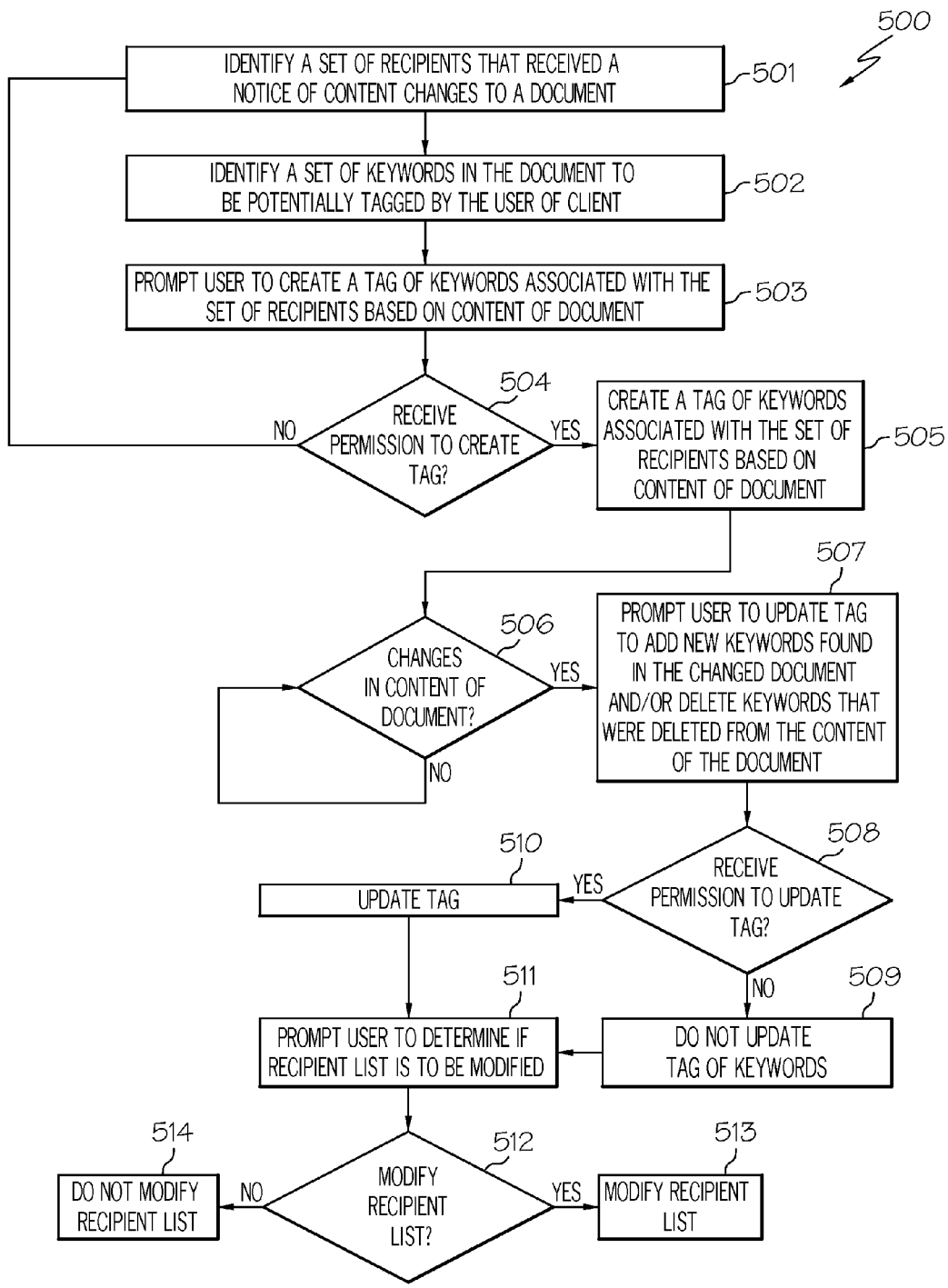
FIG. 5 is a flowchart of an alternative method for correlating a set of recipients with tagged keywords in accordance with an embodiment of the present invention.

The principles of the present invention provide a means for providing an accurate recipient list by correlating tagged keywords to the recipient list as discussed below in connection with FIGS. 3-5. FIG. 3 is a flowchart of a method for correlating a recipient list with tagged keywords. FIG. 4 is flowchart of a method for using a recipient list after the recipient list has been initially correlated with tagged keywords. FIG. 5 is a flowchart of an alternative method for correlating a set of recipients with tagged keywords.

As stated above, FIG. 3 is a flowchart of a method 300 for correlating a recipient list with tagged keywords in accordance with an embodiment of the present invention.

Referring to FIG. 3, in conjunction with FIGS. 1-2, in step 301, client 101 identifies keywords in a document, such as an electronic mail message or a word processing document. For example, client 101 (e.g., client 101A) may identify a set of keywords (e.g., processor, monitor, central processing unit) in an electronic mail message that client 101 (e.g., client 101A) sends to another client 101 (e.g., client 101B). In one embodiment, client 101 may store a list of terms that are potentially keywords, where such a list is used in identifying potential keywords to be tagged by the user of client 101. For example, terms in a document that match the terms in this list are identified as being keywords.

In step 302, client 101 presents an option to the user to tag the keywords identified in step 301.

In step 303, client 101 determines whether the user has provided permission to tag the keywords identified in step 301. "Tagging," as used herein, refers to an index term assigned to a piece of information, such as the keywords.

If client 101 has not received permission to tag the keywords, then client 101 identifies keywords in a subsequent document in step 301.

If, however, client 101 has received permission to tag the keywords identified in step 301, then, in step 304, client 101 tags the keywords. In step 305, client 101 stores the tagged keywords in a list. In one embodiment, the keywords may be stored in memory, such as memory 206, or on a permanent storage medium, such as disk 208. In one embodiment, these tagged keywords are stored in a list so that client 101 can compare the contents of documents (e.g., electronic mail messages, word processing documents) with these keywords to determine if there is a match thereby prompting the user to determine if the user wants to use the current recipient list (or modify the current recipient list) associated with these keywords, as discussed below in connection with FIG. 4. It is noted for clarity that this list may contain multiple sets of tagged keywords, that are each associated with a recipient list.

In step 306, client 101 prompts the user to provide the recipients to be correlated with the tagged keywords.

In step 307, client 101 receives the list of recipients to be correlated with the tagged keywords.

In step 308, client 101 associates the received list of recipients with the tagged keywords. Such an association may be stored in a data structure. That is, client 101 may store a data structure that contains sets of keywords that are each associated with a list of recipients. In one embodiment, such a data structure may be stored in memory, such as memory 206, or on a permanent storage medium, such as disk 208. By correlating tagged keywords with a recipient list, the recipient list can be dynamically updated as discussed below in connection with FIGS. 4 and 5.

In some implementations, method 300 may include other and/or additional steps that, for clarity, are not depicted. Further, in some implementations, method 300 may be executed in a different order than presented herein, wherein the order presented in the discussion of FIG. 3 is illustrative. Additionally, in some implementations, certain steps in method 300 may be executed in a substantially simultaneous manner or may be omitted.

As discussed above, once the recipient list has been associated or correlated with a set of keywords, client 101 compares the contents of documents (e.g., electronic mail messages, word processing documents) with these keywords to determine if there is a match thereby prompting the user to determine if the user wants to use the current recipient list (or modify the current recipient list) associated with these keywords, as discussed below in connection with FIG. 4.

FIG. 4 is flowchart of a method for using a recipient list after the recipient list has been initially correlated with tagged keywords in accordance with an embodiment of the present invention.

Referring to FIG. 4, in conjunction with FIGS. 1-3, in step 401, a determination is made by client 101 as to whether a document (e.g., word processing document from database 103, an electronic mail message) generated by the user of client 101 includes a set of tagged keywords contained in the list of tagged keywords of step 305. As discussed above, the list of tagged keywords may include multiple sets of tagged keywords that are each associated with a recipient list.

If client 101 has not identified a set of tagged keywords in the document, then, in step 401, client 101 determines if a subsequent document generated by the user of client 101 includes a set of tagged keywords using the list of keywords of step 305.

If, however, a document has been identified as containing a set of tagged keywords, then, in step 402, client 101 prompts the user of client 101 to determine if the user desires to use the predefined or presumptive recipient list associated with the set of tagged keywords (the associated recipient list is obtained from the data structure storing the tagged keywords along with their associated recipient lists as discussed above in step 308).

In step 403, client 101 determines if the user accepted the use of the predefined recipient list. If the user accepted the use of the predefined recipient list, then, in step 404, client 101 provides the user the predefined recipient list, which is obtained from the data structure storing the tagged keywords along with their associated recipient lists.

If, however, the user did not accept the use of the predefined recipient list, then, in step 405, client 101 prompts the user to determine if the user desires to modify the predefined recipient list.

In step 406, a determination is made by client 101 as to whether the user indicates to modify the predefined recipient list. If the user indicates to not modify the predefined recipient list, then, in step 407, client 101 does not modify the predefined recipient list.

If, however, the user indicates to modify the predefined recipient list, then, in step 408, client 101 receives the modifications to the predefined recipient list. For example, the user of client 101 may add additional recipients to the predefined recipient list. In another example, the user of client 101 may delete recipients from the predefined recipient list.

In step 409, client 101 stores the modified predefined recipient list to be correlated with the tagged keywords in a data structure, such as the data structure discussed above in connection with step 308. In this manner, the recipient list can be dynamically updated thereby ensuring that the recipient list is accurate.

In one embodiment, a user may be prompted to modify a recipient list based on a trust level established by an administrator. For example, if an administrator does not establish a high enough trust level for a user, then the user may not be allowed to modify the recipient list, and therefore, will not be prompted to make such a modification. If, however, the administrator established a high enough trust level for the user, then the user may be allowed to modify the recipient list, and therefore, will be prompted to make such a modification.

In some implementations, method 400 may include other and/or additional steps that, for clarity, are not depicted. Further, in some implementations, method 400 may be executed in a different order than presented herein, wherein the order presented in the discussion of FIG. 4 is illustrative. Additionally, in some implementations, certain steps in method 400 may be executed in a substantially simultaneous manner or may be omitted.

An alternative method for correlating a tag of keywords to a recipient list is discussed below in connection with FIG. 5.

FIG. 5 is a flowchart of an alternative method 500 for correlating a set of recipients with tagged keywords in accordance with an embodiment of the present invention.

Referring to FIG. 5, in conjunction with FIGS. 1-3, in step 501, client 101 identifies a set of recipients that received a notice of content changes to a document. For example, a user of client 101 may notify a certain set of recipients regarding changes to a particular document located in database 103. In one embodiment, such a notice may be sent through various mediums (e.g., electronic mail application, social interaction application, wireless device message) that may be selected by the user of client 101.

In step 502, client 101 identifies a set of keywords in the document to be potentially tagged by the user of client 101. In one embodiment, the keywords to be potentially tagged are identified using a list of terms that can be used as keywords as discussed above in connection with step 305.

In step 503, client 101 prompts the user to create a tag of keywords (identified in step 502) associated with the set of recipients (identified in step 501) based on the content of the document.

In step 504, a determination is made by client 101 as to whether client 101 receives permission from the user to create a tag. If client 101 does not receive permission from the user to create a tag, then client 101 identifies a subsequent set of recipients that received a notice of content changes involving a subsequent document in step 501.

If, however, client 101 receives permission from the user to create a tag, then, in step 505, client 101 creates a tag of keywords (identified in step 502) associated with the set of recipients (recipients identified step 501). Such an association may be stored in a data structure, such as discussed above in step 308.

After an association is made between the set of recipients and the tagged keywords, a determination is made, in step 506, by client 101 as to whether there are any changes to the content of the document (document of step 501), such as a document stored in database 103. If there are no additional changes to the content of the document, then client 101 continues to determine, at a later period in time, if there are any changes to the content of the document (document of step 501) in step 506.

If, however, there are changes to the content of the document, then, in step 507, client 101 prompts the user to update the tag to add new keywords found in the changed document and/or delete keywords that were deleted from the content of the document. The new keywords may be terms that were added to the document that are also in a list of terms that can be used as keywords.

In step 508, a determination is made by client 101 as to whether client 101 received permission from the user of client 101 to update the tag of keywords. If client 101 does not receive permission to update the tag of keywords, then, in step 509, client 101 does not update the tag of keywords associated with the set of recipients identified in step 501.

If, however, client 101 receives permission to update the tag of keywords, then, in step 510, client 101 updates the tag, such as by including the new keywords found in the changed document and/or deleting the keywords that were deleted from the content of the document. In this manner, an up-to-date tag of keywords is maintained to be associated with the document.

Upon the execution of step 509 or step 510, client 101, in step 511, prompts the user of client 101 to determine if the recipient list (recipient list identified in step 501) is to be modified In step 512, a determination is made by client 101 as to whether the user indicated to modify the recipient list (recipient list identified in step 501). If the user indicated to modify the recipient list (recipient list identified in step 501), then, in step 513, the recipient list is modified according to the user's input. For example, the user may provide additional recipients to be included in the recipient list. The user may also provide the recipients to be removed from the recipient list. In this manner, the recipient list can be dynamically updated when the content of a document has changed thereby ensuring that the recipient list is accurate.

If, however, the user indicated to not modify the recipient list, then, in step 514, client 101 does not modify the recipient list.

While method 500 discusses the user providing modifications to the recipient list and to the tagged keywords, the program of the present invention includes the capability of developing intelligence based on the user's reactions to the prompts (e.g., step 504) provided by the program of the present invention. This intelligence may allow the program of the present invention to automatically update the recipient list or tagged keywords without requesting acceptance from the user.

Furthermore, in one embodiment, a user may be prompted to modify a recipient list or tagged keywords based on a trust level established by an administrator. For example, if an administrator does not establish a high enough trust level for a user, then the user may not be allowed to modify the recipient list or tagged keywords, and therefore, will not be prompted to make such a modification. If, however, the administrator established a high enough trust level for the user, then the user may be allowed to modify the recipient list or tagged keywords, and therefore, will be prompted to make such a modification.

In some implementations, method 500 may include other and/or additional steps that, for clarity, are not depicted. Further, in some implementations, method 500 may be executed in a different order than presented herein, wherein the order presented in the discussion of FIG. 5 is illustrative. Additionally, in some implementations, certain steps in method 500 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

The invention claimed is:

1. A method for providing accurate recipient lists, the method comprising:
    identifying keywords in a document;
    tagging said identified keywords in said document in response to receiving permission from a user to tag said identified keywords;
    prompting said user to provide a list of recipients to be correlated with said tagged keywords;
    receiving said list of recipients to be correlated with said tagged keywords;
    associating, by a processor, said received list of recipients with said tagged keywords; and
    identifying a second document containing said tagged keywords.

2. The method as recited in claim 1 further comprising:
    providing said list of recipients to said user in response to identifying said second document containing said tagged keywords.

3. The method as recited in claim 1 further comprising:
    receiving modifications to said list of recipients in response to identifying said second document containing said tagged keywords.

4. A method for providing accurate recipient lists, the method comprising:
    identifying keywords in a document;
    tagging said identified keywords in said document in response to receiving permission from a user to tag said identified keywords;
    storing said tagged keywords in a list;
    prompting said user to provide a list of recipients to be correlated with said tagged keywords;
    receiving said list of recipients to be correlated with said tagged keywords; and
    associating, by a processor, said received list of recipients with said tagged keywords.

5. The method as recited in claim 4, wherein said list comprises multiple sets of tagged keywords that are each associated with a recipient list.

6. A method for providing accurate recipient lists, the method comprising:
    identifying a set of recipients that received a notice of content changes to a document;
    identifying keywords in said document;
    creating, by a processor, a tag of said identified keywords to be associated with said set of recipients; and
    updating said tag of said identified keywords with new keywords in response to further changes in content of said document.

7. The method as recited in claim 6 further comprising:
    modifying said set of recipients in response to further changes in content of said document.

8. A computer program product embodied in a computer readable storage device for providing accurate recipient lists, the computer program product comprising the programming instructions for:
    identifying keywords in a document;
    tagging said identified keywords in said document in response to receiving permission from a user to tag said identified keywords;
    prompting said user to provide a list of recipients to be correlated with said tagged keywords;
    receiving said list of recipients to be correlated with said tagged keywords;
    associating said received list of recipients with said tagged keywords; and
    identifying a second document containing said tagged keywords.

9. The computer program product as recited in claim 8 further comprising the programming instructions for:
    providing said list of recipients to said user in response to identifying said second document containing said tagged keywords.

10. The computer program product as recited in claim 8 further comprising the programming instructions for:
    receiving modifications to said list of recipients in response to identifying said second document containing said tagged keywords.

11. A computer program product embodied in a computer readable storage device for providing accurate recipient lists, the computer program product comprising the programming instructions for:
    identifying keywords in a document;
    tagging said identified keywords in said document in response to receiving permission from a user to tag said identified keywords;
    storing said tagged keywords in a list;
    prompting said user to provide a list of recipients to be correlated with said tagged keywords;
    receiving said list of recipients to be correlated with said tagged keywords; and
    associating said received list of recipients with said tagged keywords.

12. The computer program product as recited in claim 11, wherein said list comprises multiple sets of tagged keywords that are each associated with a recipient list.

13. A system, comprising:
    a memory unit for storing a computer program for providing accurate recipient lists; and
    a processor coupled to said memory unit, wherein said processor, responsive to said computer program, comprises:
        circuitry for identifying keywords in a document;
        circuitry for tagging said identified keywords in said document in response to receiving permission from a user to tag said identified keywords;
        circuitry for prompting said user to provide a list of recipients to be correlated with said tagged keywords;
        circuitry for receiving said list of recipients to be correlated with said tagged keywords;

circuitry for associating said received list of recipients with said tagged keywords; and circuitry for identifying a second document containing said tagged keywords.

14. The system as recited in claim 13, wherein said processor further comprises:

circuitry for providing said list of recipients to said user in response to identifying said second document containing said tagged keywords.

15. The system as recited in claim 13, wherein said processor further comprises:

circuitry for receiving modifications to said list of recipients in response to identifying said second document containing said tagged keywords.

16. A system, comprising:

a memory unit for storing a computer program for providing accurate recipient lists; and a processor coupled to said memory unit, wherein said processor, responsive to said computer program, comprises:

circuitry for identifying keywords in a document;

circuitry for tagging said identified keywords in said document in response to receiving permission from a user to tag said identified keywords;

circuitry for storing said tagged keywords in a list;

circuitry for prompting said user to provide a list of recipients to be correlated with said tagged keywords;

circuitry for receiving said list of recipients to be correlated with said tagged keywords; and circuitry for associating said received list of recipients with said tagged keywords.

17. The system as recited in claim 16, wherein said list comprises multiple sets of tagged keywords that are each associated with a recipient list.

* * * * *